United States Patent
Eshel et al.

(10) Patent No.: US 7,492,730 B2
(45) Date of Patent: Feb. 17, 2009

(54) MULTI-SITE CONFERENCING SYSTEM AND METHOD

(75) Inventors: Hagai Eshel, Ramat Gan (IL); Itai Yad Shalom, Tel-Aviv (IL); Eran Decker, Givataeem (IL); Moshe Lipsker, Alkana (IL); Rivka Rotkovitch, Rosh Ha'ayin (IL)

(73) Assignee: Polycom, Inc., Pleasanton, CA (US)

( * ) Notice: Subject to any disclaimer, the term of this patent is extended or adjusted under 35 U.S.C. 154(b) by 625 days.

(21) Appl. No.: 11/109,563

(22) Filed: Apr. 19, 2005

(65) Prior Publication Data

US 2006/0233120 A1     Oct. 19, 2006

(51) Int. Cl.
*H04L 12/16* (2006.01)
(52) U.S. Cl. .................. 370/260; 370/261; 379/201.01; 455/416; 709/204; 348/14.08
(58) Field of Classification Search ........................ None
See application file for complete search history.

(56) References Cited

U.S. PATENT DOCUMENTS

| | | | |
|---|---|---|---|
| 6,760,750 B1 | 7/2004 | Boneh et al. ................ 709/204 |
| 7,007,098 B1 * | 2/2006 | Smyth et al. ................ 709/233 |
| 2002/0159394 A1 | 10/2002 | Decker et al. ................ 370/252 |
| 2003/0103468 A1 | 6/2003 | Seavers et al. .............. 370/260 |
| 2005/0007446 A1 * | 1/2005 | Schrader et al. .......... 348/14.09 |
| 2005/0047336 A1 | 3/2005 | Decker et al. ................ 370/229 |
| 2005/0058088 A1 * | 3/2005 | Decker et al. ................ 370/260 |

FOREIGN PATENT DOCUMENTS

| | | |
|---|---|---|
| WO | WO02060126 | 8/2002 |
| WO | WO2005004481 | 1/2005 |

OTHER PUBLICATIONS

U.S. Appl. No. 09/708,898, filed Nov. 8, 2000, Even et al., pending.
U.S. Appl. No. 09/852,438, filed May 9, 2001, Even, pending.

* cited by examiner

*Primary Examiner*—Duc C Ho
(74) *Attorney, Agent, or Firm*—Wong, Cabello, Lutsch, Rutherford & Brucculeri, LLP

(57) ABSTRACT

A system and method for cascading local conferences into a multi-site conference is disclosed. The local conferences are located in different sites where each site has endpoints served by a local multipoint control unit (MCU). An invitation to a multi-site conference is sent to participants at the different sites. The invitation includes a conference ID of the multi-site conference. The invited participants join the multi-site conference by calling a dial-in number of the local MCU associated with the caller's site. The caller gives the conference ID of the multi-site conference to the local MCU. The system searches the plurality of local MCUs to find those local conferences having the same conference ID conducted by different MCUs. For each found conference ID, the local MCUs are cascaded to establish a multi-site conference associated with the conference ID.

26 Claims, 6 Drawing Sheets

MULTI-SITE CONFERENCING SYSTEM AND METHOD

FIELD OF THE DISCLOSURE

The subject matter of the present disclosure relates to multimedia multipoint conferencing and more particularly to a system and method for establishing and controlling a multimedia communication session between a plurality of endpoints located at different sites with a plurality of multipoint control units (MCUs).

BACKGROUND OF THE DISCLOSURE

Under the current "Global Village" trends, large corporations are distributed all over the world and have several sites, campuses, or zones situated in different states, countries, or continents. Companies and organizations are increasingly encouraging the use of audio/video conferencing as well as multipoint conferencing to improve communication and efficiency within the company. Therefore, large companies invest large sum of money to establish private communication networks in each site and between sites of the corporations. The communication networks include packet-based networks and/or circuit switch networks.

To establish the private communication networks, large companies distribute a large number of multimedia endpoints throughout the company. Usually, one or more multipoint control units (MCUs) are purchased to serve the internal multipoint multimedia conferencing needs of these endpoints. The MCUs can be installed in one or more different company sites (e.g., at a particular company building, or within a city or region) to generally serve the multipoint needs of the endpoints local to that site. The result is that the various MCUs of the company may be distributed throughout a large region, such as throughout a country or throughout the globe.

As is known in the art, a multimedia endpoint is a terminal on a network. The multimedia endpoint is capable of providing real-time, two-way audiovisual communication with other terminals or an MCU. An endpoint provides speech only, speech and video, or speech, data and video. As is known in the art, an MCU is a conference control entity located in a node of the network or in a terminal. The MCU receives several media channels from access ports. According to certain criteria, the MCU processes audiovisual and data signals and distributes them to the connected channels. Examples of MCUs include the MGC-100, which is available from Polycom Inc. Additional information about the MGC-100 can be found at the website of www.polycom.com, which is incorporated herein by reference. A more thorough definition of an endpoint (terminal) and an MCU can be found in the International Telecommunication Union ("ITU") standards such as but not limited to the H.320, H.324, and H.323 standards, which are incorporated herein by reference. (The ITU is the United Nations Specialized Agency in the field of telecommunications. Additional information regarding the ITU can be found at the website address of www.itu.int).

Several techniques have been used to improve the usage and the efficiency of multimedia multipoint communication systems. Some of these techniques improve the process of establishing a communication session by enabling reservation-less calls, ad-hoc calls, virtual meeting rooms, etc. Some of these techniques are disclosed in U.S. patent application Ser. Nos. 09/790,577, 10/954,934, and 10/960,337, which are each incorporated herein by reference.

Other techniques improve control of the multimedia multipoint communication network by offering a web server that monitors and controls one or more MCUs (a "Web-Commander" application). Exemplary techniques of web control are disclosed in U.S. Pat. No. 6,760,750, which is incorporated herein by reference. Additional techniques have been disclosed for utilizing the resources of one or more MCUs, for cascading one or more MCUs, and generally for improving resource usage of one or more MCUs. See, for example, U.S. patent application Ser. Nos. 09/708,898 and 09/852,438; PCT international published patent applications W002/060126 and WO2005/004481; and U.S. Patent Application Publication No. 2003/0103468, which are each incorporated herein by reference.

However, none of these techniques offers a solution to a global corporation or a global service provider for improving the user experience; for simplifying the process of reserving and establishing a multipoint multimedia session between participants located in different sites or zones; or for improving or sharing the use of resources, thus saving communication expenses.

Therefore, there is a need for system and method for improving the usage of multimedia multipoint facilities of large corporations distributed over two or more sites.

SUMMARY OF THE DISCLOSURE

A system and method are disclosed for establishing a multimedia multipoint session between a plurality of sites using a plurality of site-specific or local multipoint control units (MCUs). In one exemplary implementation, a corporation or a global conferencing service provider has a plurality of sites or zones, where each site has a plurality of multimedia endpoints associated with at least one local MCU capable of communication with those associated endpoints. In addition, the corporation or global conferencing service provider has one or more control servers located in one or more of the sites. More than one control server can be used for redundancy and for sharing the load of the conferencing system. In one embodiment of the disclosed system, the control servers communicate with each local MCU located in the different sites of the corporation, such as over an IP network using Internet Protocol (IP).

In an alternative embodiment of the disclosed system, the control server communicates with an administration server in addition to communicating with the local MCUs. The administration server includes, but is not limited to, an administration database of employees of a corporation or customers of the global service provider. In addition, the administration server includes an application useful for scheduling conferences, such as, but not limited to, Microsoft Outlook™. Alternatively, the administration server can communicate with another server that runs the scheduling application. The administration database includes information, including, but not limited to, names, different types of addresses (post, email, telephone, etc.), ID numbers (e.g., employee's ID number, customer's billing number, or customer's ID number), authentication numbers, personal virtual meeting room numbers (PMRN), etc.

In one embodiment of the disclosed system, each local MCU has a dial-in number associated with an entry queue. The dial-in number is a local number for the site in which the MCU is located. Different sites may use different dial-in numbers for their local MCU. Usually, the dial-in number of the entry queue is well known to the employees of the relevant site, and can be published on a web site or distributed to employees in some other fashion. There can be more than one type of dial-in number associated with the same entry queue, where each type is dependent on the type of endpoint used to dial to the entry queue. Exemplary types of dial-in numbers include a telephone number, an ISDN number, a network address, IP address/alias, a URL, or any combination of those.

In an alternative embodiment of the disclosed system, a local MCU has two or more entry queues. Each entry queue is associated with a different conference profile, with one entry queue assigned to multi-site conferences. (More information on the operation of dial-in numbers, entry queues, reserving a conference, providing a reservation-less conference, and controlling one or more MCUs by an IP server are disclosed in the above-incorporated patent and patent application references).

When a user wishes to schedule a multi-site multimedia conference, the user can send an invitation to a group of participants to participate in a multi-site conference. Such a user can be referred to as the initiator, chairperson, or moderator of the conference. The invitation can include the date, time, subject of the conference, a conference password if needed, and a conference identifier or numerical identification, which is referred to herein as a "conference ID." The conference ID is a unique identifier or number for each multi-site conference, and the same conference ID is used in all the sites of the organization (the corporation or the service provider) for a given multi-site conference. The invitation may or may not be sent in parallel to the control server.

The unique conference ID can be the employee ID number of the moderator of the conference or a personal virtual meeting room number (PMRN) granted to certain employees according to their position in the organization, for example. In a similar way, the conference ID can be a billing code of a customer of the service provider, or a random number with a certain number of digits that is selected by the moderator or automatically generated. Accordingly, the conference ID can be any unique identifier for a multi-site conference.

When the time for the multi-site conference has arrived, an invited participant dials the local dial-in number of the local MCU of the participant's site. If the local MCU has two or more dial in numbers, the invited conferee dials the local dial-in number associated with the appropriate profile of the conference. Each local MCUs is configured to welcome a new caller and to place the call in the entry queue. The call is retrieved from the entry queue according to its position in the queue, and an Interactive Voice Response (IVR) session is initiated with the new caller. The new caller is requested to enter the conference ID of the conference and to enter a password, if required.

The local MCU is preferably configured to authenticate the new caller. At the end of the authentication stage, the local MCU determines whether to connect or reject the call. In an alternative embodiment, the parameters received from the new caller during the IVR session are transferred to an administration server for authentication. The local MCU proceeds with the call according to the results of the authentication process returned from the administration server.

If authentication is successful, then the local MCU searches for any existing conference having the same conference ID entered by the new participant as a precursor to cascading the local MCUs together to form a multi-site conference). If such a conference exists, the new call is added to the found conference. If there is no conference with the same conference ID, then a conference with this conference ID is established, and the new caller is added. (As used in the present disclosure, a "conference" refers to the situation where one or more endpoints have connected to an MCU. In other words, "conference" not only refers to the situation where two or more endpoints have connected to an MCU, but also refers to the situation where only one local endpoint (e.g., only one participant) has connected to an MCU. It is in this spirit that the term "conference" is intended to be understood throughout the present disclosure.)

The same process takes place for each participant in each one of the local MCUs involved in the multi-site conference. In parallel and in the background of the activity of the MCUs and the new callers, the control server polls (e.g., runs a periodic or triggered search) of each local MCU using an application program interface (API) of the MCU. Each local MCU is requested to deliver its status, which includes a list of existing conferences. For each conference, the MCU reports the conference ID, number of connected local endpoints, connection parameters of the local conference, etc.

After collecting the status of all the local MCUs, the control server searches to see if the same conference ID has been associated with two or more local MCUs. If the same conference ID is associated with two or more local MCUs, and each local MCU has at least one connected endpoint, then the local conferences with the conference ID are deemed to be part of the same conference (i.e., a "multi-site conference"). If such a multi-site conference is found, the control server checks whether one of the local MCU is appointed as a master MCU for that multi-site conference. If none of the local MCUs is already appointed as the master, then one of the local MCUs is selected as a master MCU. The rest of the local MCUs are appointed as slaves MCUs. The master MCU of a multi-site conference is the MCU that is communicating with each one of the other MCUs that participate in this multi-site conference. Each slave MCU is connected as a participant of the multi-site conference conducted over the master MCU.

For each slave MCU to be connected to this multi-site conference, a determination is made whether to instruct the master MCU to call the slave or vice versa to cascade the MCUs together. The determination is based on several criteria, including, but not limited to, the cost of communication between the sites and the availability of resources. In an exemplary embodiment of the disclosed system, each MCU has a separate dial-in number (MCU dial-in number, an MCU entry queue) used for creating cascading links between the MCUs. If the master MCU is instructed to call a slave MCU, the master dials the slave's MCU dial-in number. If the slave MCU is alternatively instructed to call the master MCU, the slave dials the master's MCU dial-in number.

If a master MCU was previously selected for this multi-site conference, then each local MCU having a local conference with the same conference ID but not yet connected to the master MCU for the multi-site conference is appointed as a new slave MCU. Then, for each new slave MCU, a connection decision is made. The decision can be based on the same criteria as it is disclosed above.

Once the multi-site conference is connected, the system can continue to operate to ensure that the established cascading links are still sensible. This is useful and beneficial because the a multi-site conference is not static: different users and/or sites can log into or out of the conference at different times, and so what initially seemed a sensible way to cascade the multi-site conference between the various MCUs may later not be sensible. For example, once the multi-site conference is established, the control server searches for any local MCUs that do not have any connected endpoints. If such an MCU is found and is a slave MCU, then this slave MCU is instructed to terminate its cascading link with the master MCU, as it is unnecessary in the conference. If such an MCU is found and is a master MCU, then the control server determines whether there are at least two slaves MCUs serving the same conference ID via the master MCU. If this is true, the cascading link remains active. If this is false, the control server instructs the master MCU to terminate the cascading link of the slave MCUs relevant to the conference ID and to terminate the conference, because in this instances the slave MCU is capable of handling the conference on its own. If the conference is a reserved conference, then the decision to reconfigures the conference in these ways can be postponed by a certain grace period from the reservation start time so that the links in the conference are not inadvertently and automatically changed in a manner inconsistent with the reserved conference.

If one of the reported connection parameters indicates that one of the cascaded links in the multi-site conference has disconnected, the control server starts a reconnection process. The reconnection process includes several options performed one after the other until a connection is set. The process starts by returning on the same path, different paths, or different types of networks (e.g., IP or ISDN).

In an alternative embodiment in which two or more control servers are used in parallel, each control server can run independently from the others. The period between the surveys or polls can be the same for each control server. However, the control servers are preferably configured to start their surveys in a shifted time frame compared to each other.

In one embodiment of the disclosed system, a control server is configured to have a central table with all necessary information related to the current local conferences conducted over the sites of the corporation. An entry for a local conference includes, but is not limited to, a conference ID, a master/slave indication, connection information, and an MCU ID number for the conference. In an alternative embodiment, each local MCU is configured to name a link to other local MCUs related to a multi-site conference, wherein the name includes connection parameters of the cascading link. In such an embodiment, a central table is not needed, because information regarding the multi-site conferences at the local MCUs is shared via these link names. In a further embodiment, the information regarding the multi-site conference is saved in a table in each MCU. In such an embodiment, the local MCU delivers a copy of this table to one or mores control servers when needed.

The foregoing summary is not intended to summarize each potential embodiment or every aspect of the present disclosure, and other features and advantages of the present disclosure will become apparent upon reading the following detailed description of the embodiments with the accompanying drawings and appended claims.

Furthermore, although specific exemplary embodiments are described in detail to illustrate the inventive concepts to a person skilled in the art, such embodiments are susceptible to various modifications and alternative forms. Accordingly, the figures and written description are not intended to limit the scope of the inventive concepts in any manner.

BRIEF DESCRIPTION OF THE DRAWINGS

Exemplary embodiments of the present invention will be more readily understood from reading the following description and by reference to the accompanying drawings, in which.

DETAILED DESCRIPTION OF EXEMPLARY EMBODIMENTS

Figure 1A:
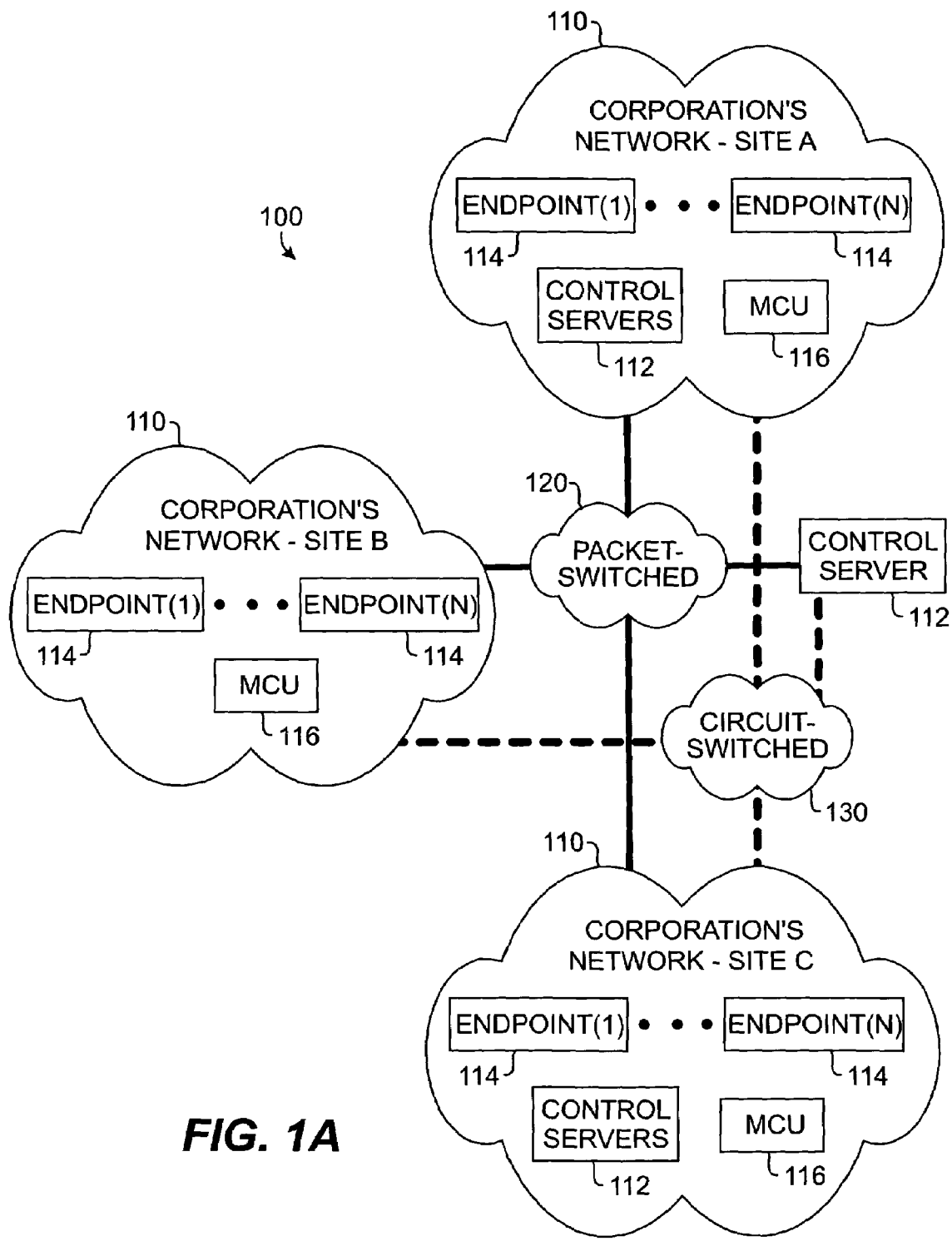
FIG. 1A illustrates an embodiment of a multimedia multi-site conferencing system.

FIG. 1A illustrates a block diagram of an embodiment of a multi-site conferencing communication system 100. The system 100 can be used by a large corporation having a plurality of network sites 110 or by a global conferencing service provider having a plurality of zones 110. The sites or zones 110 communicate with each other via packet-switched networks 120 and/or circuit switched networks 130. Each site 110 has a plurality of multimedia endpoints 114 and one or more local or site-specific multipoint control units (MCUs) 116. One or more control servers 112 can be located at one site 110, located at more than one site 110, or located elsewhere in the network 120.

In the exemplary embodiment of FIG. 1A, one control server 112 is used in each site 110. For redundancy, each control server 112 can run independently from the others. Within each site 110, each of the local endpoints 114 communicates with its associated local MCU 116 via a packet-switched network and/or circuit switched network (not shown). Those skilled in the art will appreciate that the number of sites 110, endpoints 114, MCUs 116, and control servers 112 shown in FIG. 1A is only exemplary and is done for convenience of presentation.

In one embodiment of the disclosed system 100, the control server 112 is a web server that can communicate with each local MCU 116 over an IP network 120 using Internet Protocol (IP). Communicating with the MCU 116 is done via an application program interface (API) module (not shown), which is part of the MCU 116. In one embodiment of the disclosed system 100, the control server 112 is a dedicated server for performing cascading of multi-site conferences, but may also be embedded in one of the MCUs 116, or may comprise applications sharing a single web server. For example, the single web server can perform additional conferencing applications and can be used for managing reservation-less calls, ad-hoc calls, virtual meeting room, monitor and control the MCUs ("Web-Commander"), etc., as disclosed in the above-incorporated patents and patent application references.

In an alternative embodiment, the control server 112 can communicate with an administration server of the corporation or the global service provider (not shown) in addition to communicating with the MCUs 116. The administration server includes an administration database of employees or customers of the global service provider and includes a scheduling application, including, but not limited to, Microsoft Outlook™, for example. Alternatively, the administration server can communicate with another server that runs a scheduling application. The administration database includes personal information, including, but not limited to, names, different types of addresses (e.g., post, email, telephone, etc.), ID numbers (e.g., employee's ID numbers, customer's billing numbers, or customer's ID numbers), authentication numbers, and personal virtual meeting room numbers (PMRN).

Figure 2:
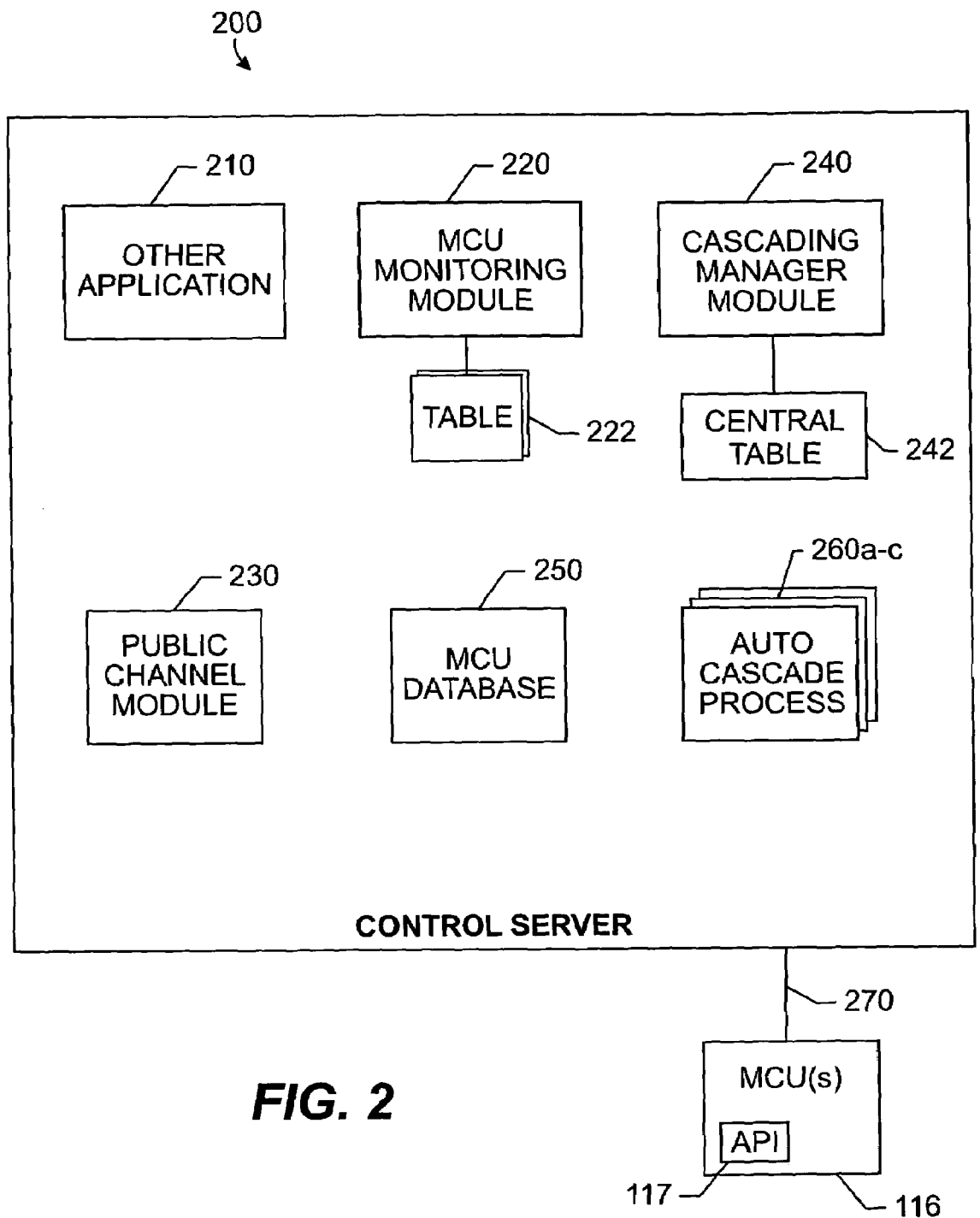
FIG. 2 schematically illustrates a control server operative according to certain teachings of the present disclosure.

More information on the operation of the control server 112 is disclosed below in conjunctions with FIGS. 2, 4, and 5.

Figure 1B:
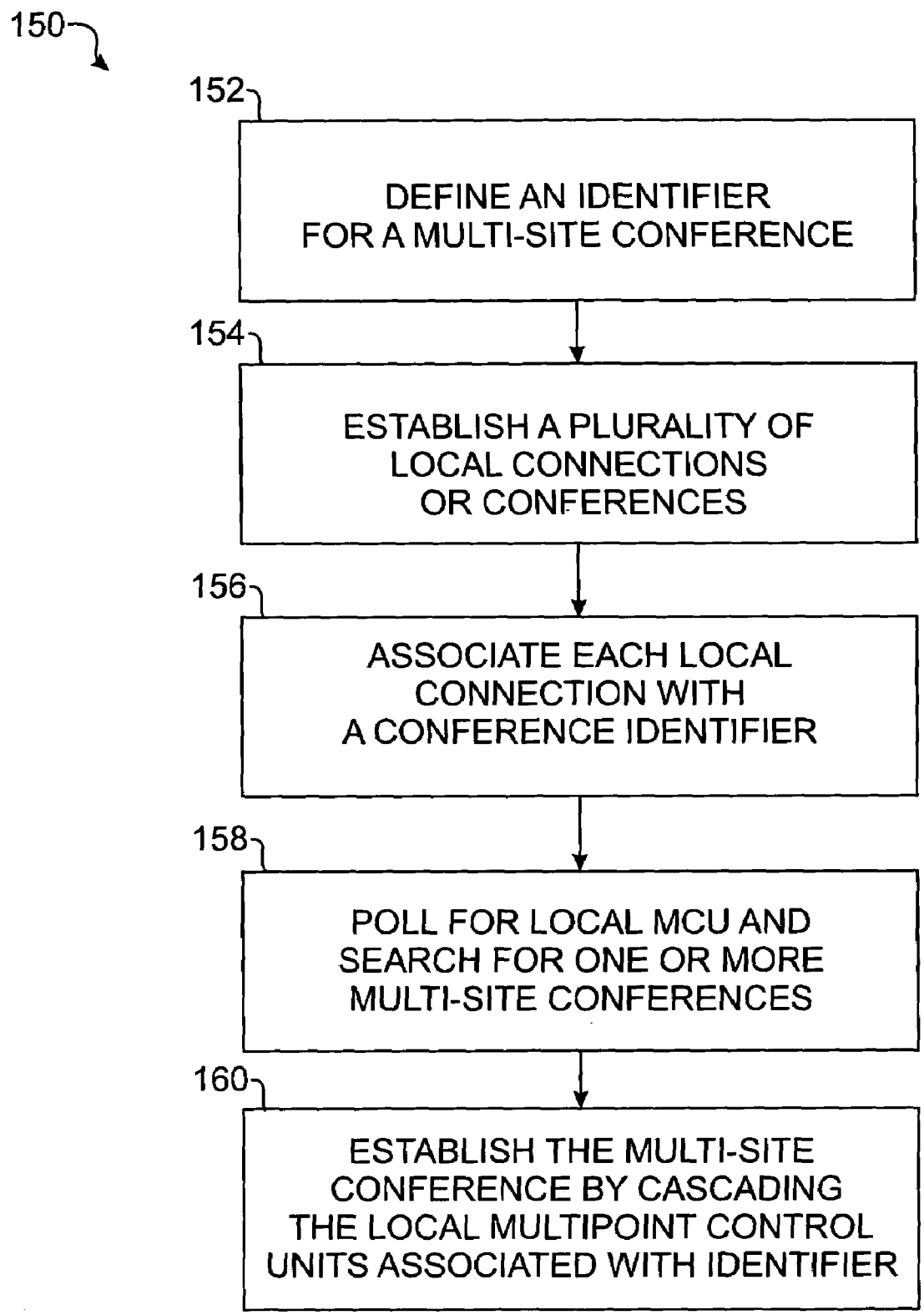
FIG. 1B illustrates a flowchart showing an embodiment of a process for establishing a multi-site conference between a plurality of local multipoint control units.

FIG. 1B illustrates a flowchart showing an embodiment of a process 150 for establishing a multi-site conference between a plurality of local multipoint control units. A unique identifier or conference ID for a multi-site conference is defined (Block 152). This can be done for example when a moderator makes a reservation for the multi-site conference. In each site or zone (110; FIG. 1A), a plurality of local or site-specific conferences are established between local multipoint control units (116; FIG. 1A) and their associated endpoints (114; FIG. 1A) (Block 154). For example, invited participants to the multi-site conference call a dial-in number for the local MCU to which the participant's endpoint is associated. When the local conferences are established, each one of the local conferences is associated with a conference ID (Block 156). For example, the participants wishing to join the multi-site conference may enter the defined identifier or conference ID as an input from their endpoint (114; FIG. 1A) to their associated MCUs (116; FIG. 1A). Additional details related to the acts of Block 156 are discussed below with reference to FIG. 3.

Next, one or more control servers (112; FIG. 1A) of the system polls for local multipoint control units (116; FIG. 1A) having conferences associated with an identifier or conference ID searching for one or more multi-site conferences (Block 158). Additional details related to the acts of Block 158 are discussed below with reference to FIG. 4. For those local conferences associated with the conference ID, the multi-site conference is established by cascading the associated local multipoint control units (Block 160). Additional details related to the acts of Block 160 are discussed below with reference to FIG. 5.

As noted above, aspects of the process 150 for establishing the multi-site conference are performed by a control server. FIG. 2 illustrates a block diagram of an embodiment of a control server 200 shown with respect to an MCU 116. The control server 200 is shown with respect to one MCU 116 in FIG. 2 for illustrative purposes only. It is understood that the control server 200 does not have a specific relationship with any of the one or more MCUs 116. As discussed in more detail herein, the control server 200 is adapted to search for local conferences associated with a multi-site conference. The local conferences for the multi-site conference have the same conference identifier or Numerical Identification (referred to herein as conference ID) conducted over two or more local MCUs 116. The control server 200 is also adapted to define a master MCU for a multi-site conference and to establish one or more cascading links between the master MCU and the other MCUs, i.e., slave MCUs, to establish the multi-site conference. Furthermore, the control server 200 is adapted to maintain and if necessary optimize the cascading links as long as the multi-site conference exists.

In one embodiment, the control server 200 is embedded within a server that performs additional functionality for controlling multimedia conferences. For example, the control server 200 can be embedded in a server used for servicing reservation-less calls, ad-hoc calls, virtual meeting room, or embedded in a server used for monitoring and controlling one or more MCUs. The other applications module 210 can perform these functionalities, as are disclosed in the U.S. patents and patent applications references incorporated above.

Among other application modules 210, the control server 200 includes an MCU monitoring module 220, a public channel module 230, a cascading manager module 240, a MCU database 250, and a bank 260A-C of auto cascade processes for multi-site conferencing (i.e., for an conference ID). These various modules of the control server 200 will be discussed in turn.

Public channel module 230 is a communication module for communicating with an API module 117 of each one of the MCUs 116. In an embodiment in which the network 270 for communicating between the control server 200 and the MCUs 116 is an Internet Protocol (IP) network, then the public channel module 230 uses communication protocols, including, but not limited to, TCP/IP or UDP/IP. In an alternative embodiment where the network 270 is not an IP network, then the public channel module 230 is adapted to the protocol used over that other network. For example, if the network 270 that connects the MCUs 116 with the control server 200 is based on telephony, then the public channel module 230 includes a modem for calling each one of the MCUs 116, which also has a modem (not shown).

The MCU monitoring module 220 stores information on local conferences currently conducted over the local MCUs 116. Collecting the stored information can be done periodically or can be triggered by the cascading manager module 240. In another embodiment, each one of the MCUs 116 can initiate the process of collecting the stored information. In such an embodiment, the control server 200 and the MCUs 116 can use "subscribe/notify" mechanisms, which are disclosed in SIP RFC 3265, which is incorporated herein by reference. In particular, a notification is sent from a MCU 116 to the control server 200 when a conference is initiated or terminated. More information on "subscribe/notify" mechanism can be found at the SIP web site.

In one embodiment of the control server 200, the MCU monitoring module 220 communicates via the public channel module 230 with each one of the local MCUs 116 and requests the status of each local conference currently conducted by the MCU 116. Among other parameters, the status of each local conference includes a conference ID and includes a list of participants including their link name. The list of participants also indicates any of the local MCUs 116 that have already been cascaded to one or more multi-site conferences. The information from the local MCU 116 is organized in a monitoring table 222 associated with the local MCU 116. At the end of the process, the MCU monitoring module 220 can have a plurality of monitoring tables 222 corresponding to the number of local MCUs 116 in the sites, zones, or groups of local MCUs associated with the control server 200. Each monitoring table 222 is used later by the cascading manager module 240 while establishing (or searching for changes in) the one or more multi-site conferences, as disclosed below in conjunction with FIG. 4.

When one of the other applications 210 is a "Web-Commander" application, the MCU monitoring module 220 requests that the "Web-Commander" application 210 deliver the status of each one of the local conferences on each one of the local MCUs 116. Such requests can be done periodically or can be triggered by the cascading manager module 240. The Web-Commander application 210 is adapted to automatically monitor the local conferences on each one of the MCUs 116. The MCU monitoring module 240 organizes the information received from the Web-Commander 210 into the monitoring tables 222.

MCU database 250 includes information on the relevant local MCUs 116. For each MCU 116, the database 250 has parameters, such as but not limited to, a dial-in number used for cascading by another MCU 116, information about available resources (e.g., audio, video, data, network interfaces, etc.) of the MCU 116, communication cost to the other MCUs 116 in the groups of MCUs 116, etc. Some of the parameters are configured while installing the control server 200 or can be manually updated. The dial-in number can have one or more options. For example, one dial-in number can be used as a main number and another dial-in number can be used for an optional connection. Some of the parameters, such as the available resources, can be updated via operation of the control server 200. For example, the available resources can be updated via communication with one or more gatekeepers, SIP proxy or application servers (not shown) that are associated with the disclosed system.

The cascading manager module 240 manages the process of cascading local MCUs to form one or more multi-site conferences. From time to time, the cascading manager module 240 requests the MCU monitoring module 220 to deliver an updated monitoring table 222. The cascading manager module 240 organizes the received information from the monitoring tables 222 into one central monitoring table 242, which can be sorted, for example, according to conference IDs. Then, the cascading manager module 240 searches for the local conferences in the central table 242 that have the same conference ID and are conducted over two or more local MCUs 116. For each of these local conferences found, the cascading manager module 240 creates an auto cascading process 260. More information on the operation of the cascading manager module 240 and the auto cascading process 260 is disclosed below in conjunction with FIGS. 4 and 5.

Figure 3:
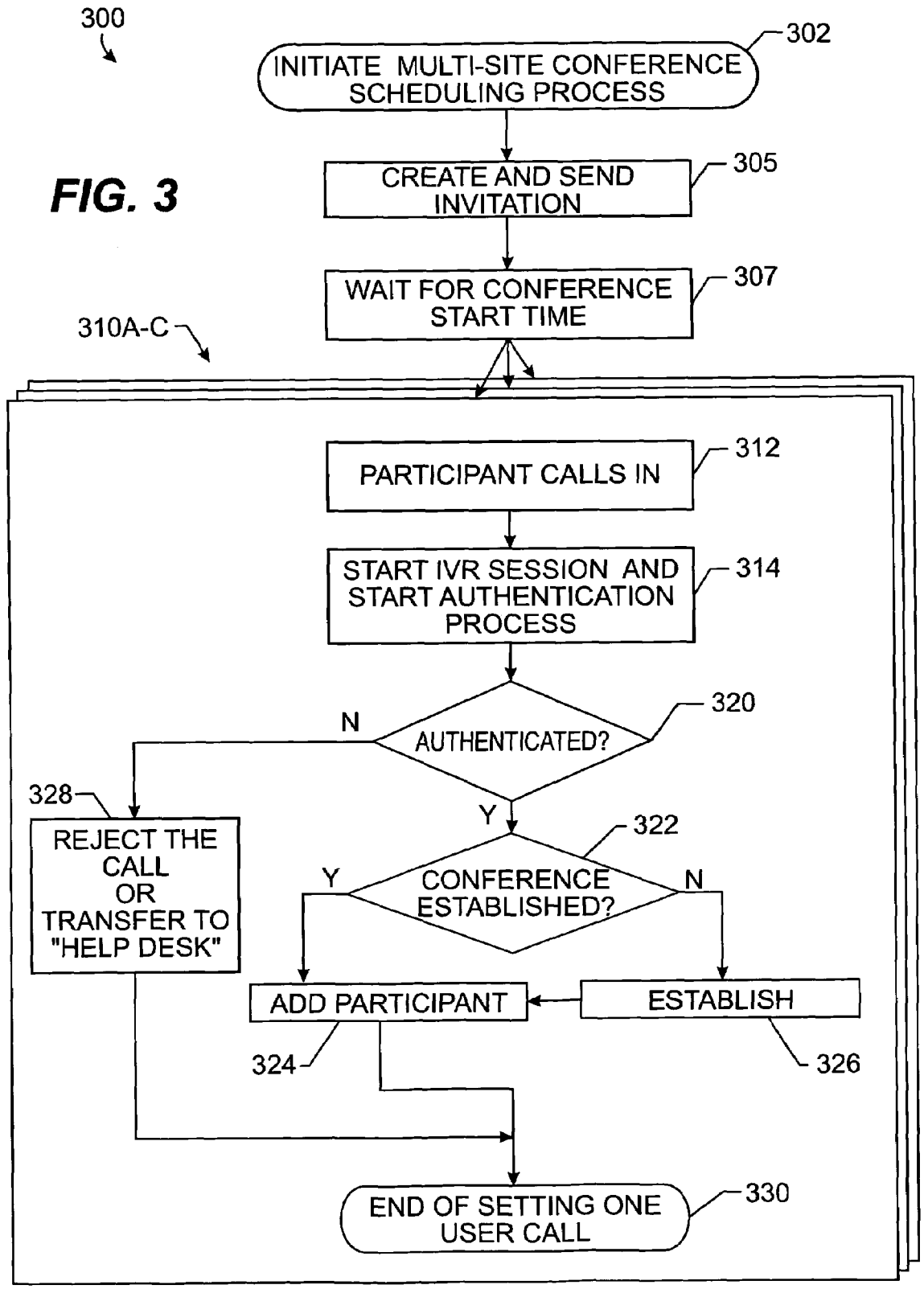
FIG. 3 illustrates a flowchart showing an embodiment of a process for preparing an invitation for a multi-site conference and for joining the multi-site conference.

FIG. 3 illustrates a flowchart of an embodiment of a process 300 for establishing a multi-site conference. The process 300 is initiated by a moderator of the conference, who schedules a multi-site conference (Block 302). Then, the moderator sends an invitation to relevant participates (Block 305). Creating and sending the invitation depends on the type of system used. For example, if the system belongs to a corporation, then the moderator can have a personal virtual meeting room number (PMRN), or the moderator can schedule a virtual meeting room via a scheduling server of the organization. Then, the invitation is sent to the other participants via the scheduling application. In other embodiments, the invitation can be sent by an email, SMS, or via telephone call, for example. The invitation includes the time, subject, and the conference ID, which can be the PMRN or the virtual meeting room conference ID. The dial-in number may already be known, may be added to the invitation, or may be published in the web site of the corporation, for example.

If the disclosed system belongs to a global service provider, the moderator registers at the service provider to get a conference ID for the conference. There are cases where the moderator may already be a customer of the global service provider and may have a conference ID to be used when needed. In such an embodiment, the invitation is sent to the other participants by an email, for example, with the time, subject, and the relevant conference ID. In addition, the invitation can include a website address of the global service provider so that each participate can find a dial-in number that is close to his area. More information on virtual meeting rooms and dial-in numbers can be found in U.S. patent and patent applications incorporated above.

During the scheduling process 300, the start time for the multi-site conference can be set to a particular time, or can be established immediately after sending the invitation, amounting to an "ad-hoc call." Regardless, once the starting time of the multi-site conference has been established, the participants wait for the appropriate time to start the multi-site conference (Block 307). (For an ad-hoc call, the appropriate time can be contemporaneous with the invitation). Once the start time of the multi-site conference has arrived, each participant, including the moderator, starts a call establishment process 310A-C to join the multi-site conference, which can be performed independently and in parallel to other calls.

The call establishment process 310 for a participant starts when the participant calls the dial-in number associated with the local MCU of the participant's site (Block 312). The local MCU associated with this dial-in number responds to the call and starts an IVR session and an authentication process with the participant (Block 314). During the authentication process of Block 314, the conference ID is requested with or without a password. The participant enters the conference ID as input from their endpoint. Then, authentication is accomplished in the local MCU, or the information is transferred to an administration server for authentication.

A determination is made whether the authentication has been successfully performed (Block 320). If the authentication is successful, the local MCU determines whether a local conference with the same conference ID has already been established at the participant's site (Block 322). If already established, then the new caller is added to the established, local conference (Block 324). If a local conference with the relevant conference ID has not been established yet at Block 322, then the local MCU establishes a local conference (Block 326) and adds the new participant (Block 324). After adding the participant to the local conference, the call establishment process 300 for this participant is terminated (Block 330). If the authentication process was unsuccessfully performed at Block 320, then the call is rejected (Block 326), and the process 300 terminates (Block 330). The caller may or may not be informed of the failed authentication.

In an alternative embodiment, the unauthorized participant can be transferred to a "help desk queue" to be served by an operator (Block 328). More information on the call establishment process can be found in the U.S. patent and patent applications incorporated above.

Figure 4:
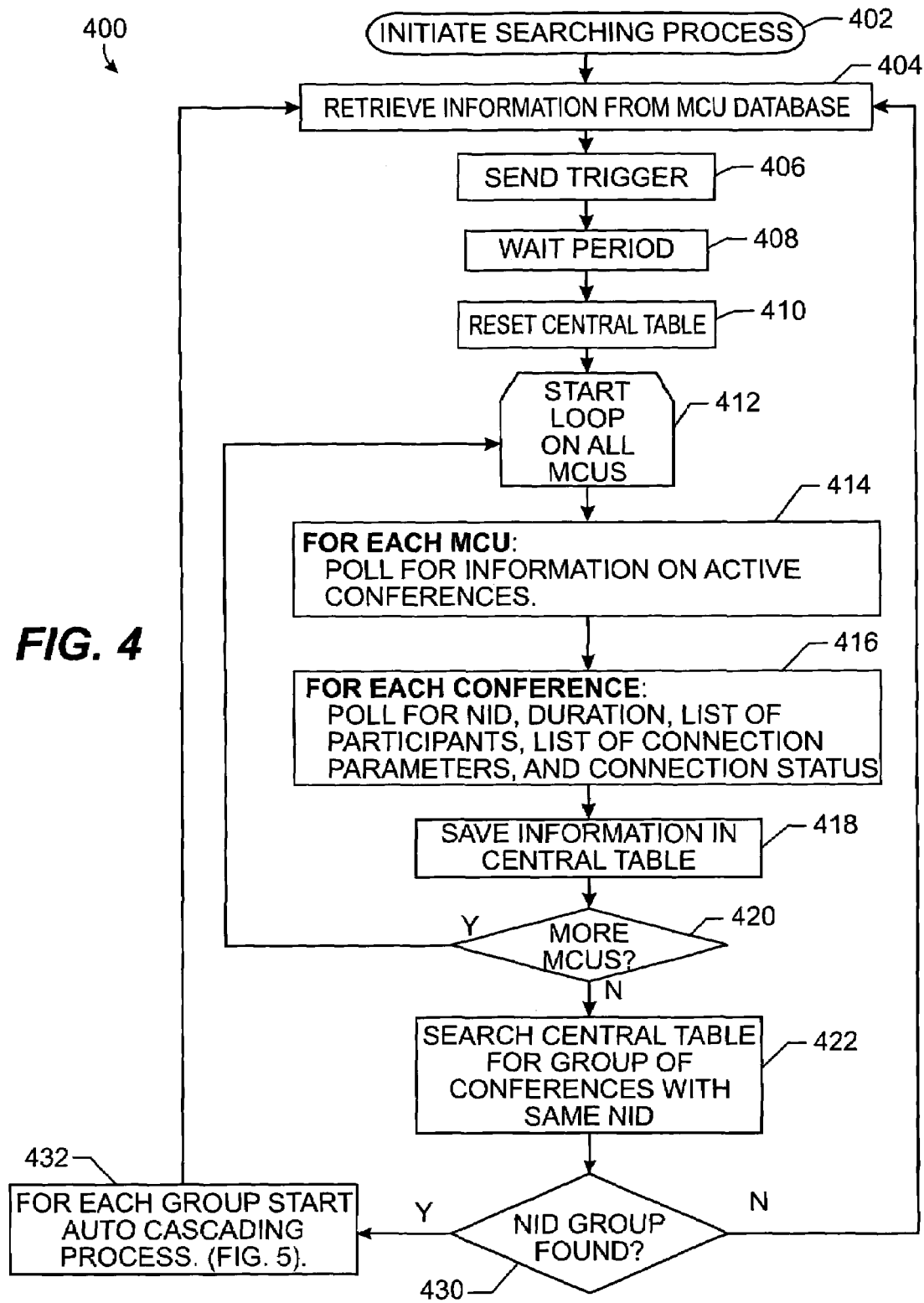
FIG. 4 illustrates a flowchart showing an embodiment of a process for searching for local conferences associated with a multi-site conference.

Referring to FIG. 4, a flowchart illustrates an embodiment of a process 400 for searching with a control server (112; FIG. 1A or 200; FIG. 2) to find local conferences having the same conference ID, which are, therefore, to be associated with a multi-site conference having the same conference ID. The searching process 400 is initiated by the control server (Block 402) and runs in a loop so long as the control server is active. After initiation at Block 402, relevant parameters for the MCUs in the corporation or with the service provider are retrieved from the MCU database (250; FIG. 2) (Block 404). The parameters include, but are not limited to, the IP address/aliases of the relevant MCUs. Then, a trigger to start collecting status information from the MCUs (116; FIG. 2) is sent to the MCU monitoring module (240; FIG. 2) (Block 406). The process 400 then waits for a period of time in the range of a few tens of seconds (Block 408) before starting a loop for searching for a multi-site conference (Block 412).

In an alternative embodiment, the searching loop (Block 412) can be initiated by one of the MCUs. For example, each MCU (116; FIG. 2) can be configured to send a status report to the control server (200; FIG. 2). Such a status report can be sent periodically or can be sent when a change occurs in the conferences that are managed by the MCUs. In one embodiment, the control server (200; FIG. 2) can "subscribe" to each MCU (116; FIG. 2) and receive a "notify" when a conference is initiated or terminated. Subscribing can be preformed according to SIP RFC 3265.

At the end of the waiting period in Block 408, the process 400 resets a central monitoring table (Block 410). (Such a central monitoring table is shown as element 242 in FIG. 2). Then, a loop (Blocks 412 through 420) is started for retrieving the status of each local MCU. For each MCU, the process 400 polls for information on active local conferences (Block 414).

For each active conference, status information is obtained. The status information includes, but is not limited to, the conference ID, the duration, the list of participants, the list of link names, the connection parameters, and the connection status. In one embodiment, the status information is embedded in one of the monitoring tables (222; FIG. 2) associated with the relevant MCU (116; FIG. 2). In an alternative embodiment in which monitoring tables are not used, the status information can be retrieved at Block 412 by applying to the API (117; FIG. 2) of the relevant MCU (116; FIG. 2). Applying to the MCU can be done via MCU monitoring module (220; FIG. 2) or via one of the other applications (210; FIG. 2) of the control server (200; FIG. 2).

The retrieved status information on the relevant MCU is sorted according to the conference ID and is added to the information of other MCUs stored in the central table (242; FIG. 2) (Block 418). Then, a determination is made whether there are more local MCUs in the group of MCUs monitored by the control server (Block 420). If there are more MCUs, the process 400 returns to Block 412 to retrieve status information on the next MCU in the group. If there are not more MCUs, the process 400 continues searching the central table (242; FIG. 2) for a conference ID that has two or more entries (Block 422).

At the end of the search, a determination is made whether a conference ID in the central table (242; FIG. 2) has a group of two or more entries associated with it (Block 430). If there is no such a conference ID, it means that during this loop there is no active local conferences that need to be cascaded to form a new multi-site conference, or that need to be joined to an existing multi-site conference. The process 400 returns to Block 408 to wait for the start of a new polling loop (Blocks 412-420).

If there is one or more conference ID that has two or more entities associated with each one of the IDs, then each group of the local conferences with one of those conference IDs represent local conferences belonging to a multi-site conference needing cascading, and thus an auto cascading process is initiated (Block 432) for each one of the groups. One exemplary auto cascading process for local conferences having the same multi-site conference ID is disclosed below in conjunction with FIG. 5. After initiating the auto cascading process at Block 432, the process 400 returns to Block 408 to wait for the start of a new polling loop (Blocks 412-420).

Figure 5:
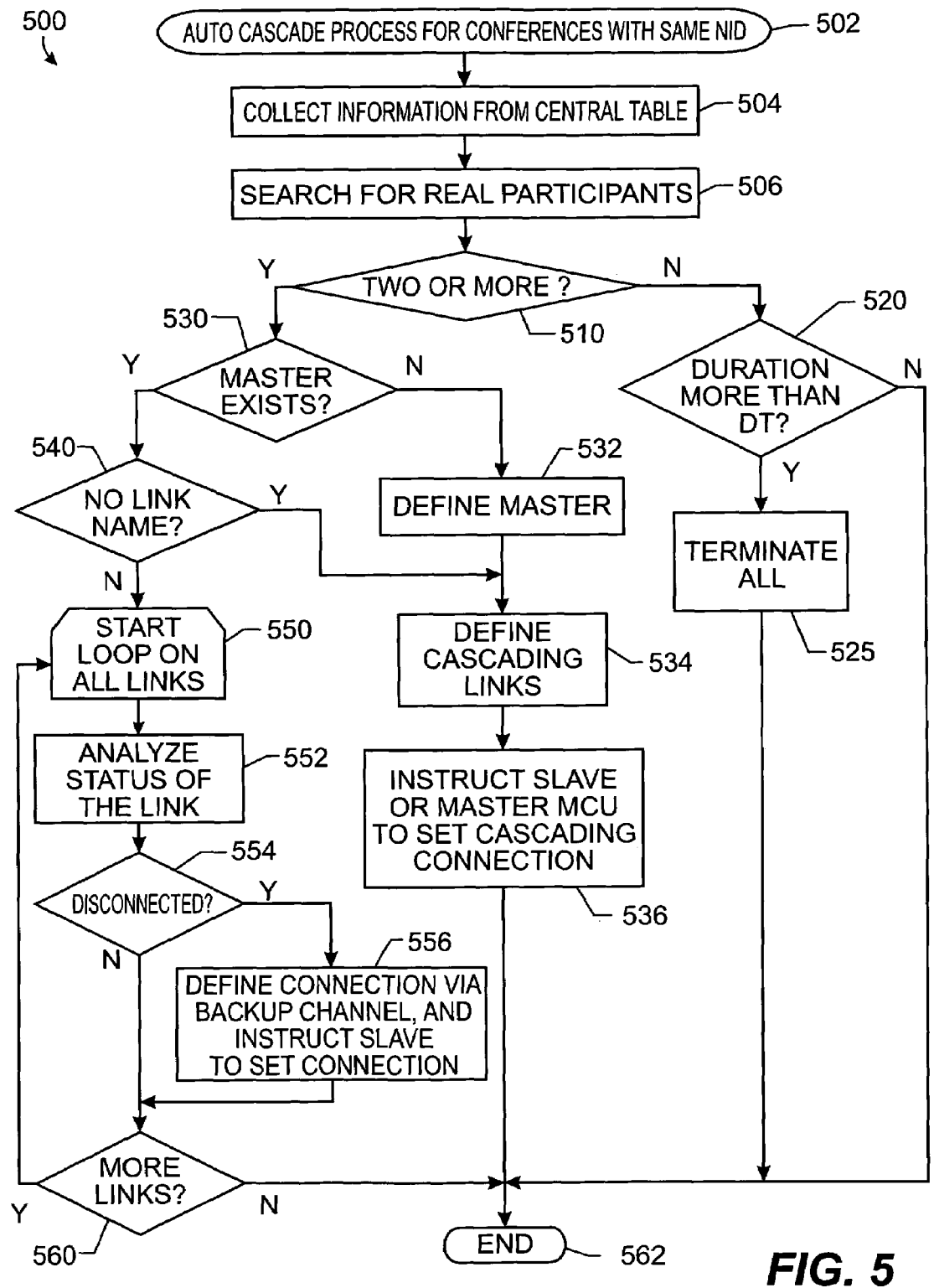
FIG. 5 illustrates a flowchart showing an embodiment of a process for automatically cascading multipoint control units using a control server.

FIG. 5 illustrates a flowchart showing an embodiment of an auto cascading process 500 to establish a multi-site conference by automatically cascading one or more local MCUs having local conference with the same conference ID. After initiation at Block 502, the process 500 collects information from the entries in the central monitoring table (242; FIG. 2) associated with the relevant conference ID (Block 504). Among other parameters, the information includes, but is not limited to, the ID number of the MCU to participate in the multi-site conference, the master/slave indication, the connection information, and the list of participants including their link name. The list of participants can also include other MCUs that have already been cascaded to the conference.

After organizing the different parameters of the multi-site conference, a search of each identified MCU is made for links to "real participants" (Block 506), i.e., a link to an endpoint as opposed to a link to another MCU. Afterwards, a determination is made whether there are two or more MCUs each with at least one real participant (Block 510). If not (e.g., if only a first participant has called in to his local MCU), the duration of the conference in each one of these MCUs is compared to a predefine value 'DT' (Block 520), which can be in the range of a few minutes, for example. This predefined value DT recognizes that a multi-site conference may just have been initiated, such that not all participants have connected. If, therefore, there is at least one MCU with a conference duration less than the predefined value 'DT', the current process 500 of auto cascading of the relevant multi-site conference is terminated at Block 562, and the process 500 can be re-initiated in the next loop (Block 412; FIG. 4) of the searching process. In other words, the cascading process is postponed because the multi-site conference is not yet mature enough (in terms of numbers of participants) to yet warrant cascading.

If all of the MCUs have a conference duration greater than DT, and there are not two or more with at least one real participant, then the relevant multi-site conference is terminated (Block 525). In this circumstance, it is assumed that enough time has passed to allow participants to connect, or the multi-site conference is effectively ended. Thus, the control server (200; FIG. 2) instructs each MCU (116; FIG. 2) associated with the relevant multi-site conference to terminate the multi-site conference with the relevant conference ID and to release the resources that have been allocated for the multi-site conference with the relevant conference ID. The connected participant is informed by their MCU that the multi-site conference has been terminated.

Returning now to Block 510, if there are two or more MCUs with at least one real participant in each one of them, then a determination is made whether a master MCU has been defined (Block 530). In one exemplary embodiment, the link name indicates whether an MCU is a master or a slave. In an alternate exemplary embodiment, the central table (242; FIG. 2) is not reset at Block 410 of FIG. 4 at the beginning of each loop of the searching process (400; FIG. 4). In such an embodiment, a field in the central table (242; FIG. 2) can indicate whether the MCU is a master or a slave. If two or more control servers are used by an organization, an update of the central table can be sent to the other control servers at the end of each loop.

If there is not a master MCU determined at Block 530, then one of the MCUs is defined as a master MCU (Block 532). In one embodiment, selecting an MCU as master is based on several criteria. In one criterion, the MCU that serves the moderator of the multi-site conference can be defined as the master MCU for that multi-site conference. Alternatively, the MCU connected to the first participant to call the conference can be defined as the master MCU. Alternatively, selecting a master MCU can be based on the ID of the MCU (e.g., the highest ID number in the group can be defined as the master MCU), or can be based on picking the MCU with the most free resources. Other embodiments can use any combination of these methods. For example, the moderator's MCU can be defined as the master, and the MCU of the first participant can be defined as the master if the moderator has not called-in yet.

After defining the master MCU for the multi-site conference at Block 532, the cascading links between the master MCU and the slave MCUs are defined (Block 534). Defining the links is based on information stored in the MCUs database (250; FIG. 2). For each slave MCU, a determination is made whether the master MCU will call the slave or vice versa. For example, the decision can be based on the communication cost, the available resources, type of networks etc.

In one exemplary embodiment, a link name is given to each one of the cascading links in each of the MCUs involved in the relevant multi-site conference. The link name includes connection information. For example, a link name can have the following structure: [Current MCU ID number] [Other MCU type M/S] [Other MCU ID Number] [Primary or Secondary connection 1/2] [conference ID]. 'M' stands for Master MCU, 'S' stands for slave MCU, '1' stands for primary connection (e.g., a connection over an ISDN), and '2' stands for secondary connection (e.g., a connection over an IP network).

The present disclosure will now discuss an exemplary implementation to illustrate the technique of defining link names. In the example implementation, a multi-site conference taking place over three different sites may use three MCUs and have the conference ID number "9322672." Assuming that a total of six MCUs are connected to system, the three MCUs being used in conference 9322672 may be MCU #02, MCU #04, and MCU #05.

The selected master MCU for this conference may be MCU #04. The master MCU #04 has a cascading link for each slave MCU. The link names for those links can be [04][S][02][2][9322672] and [04][S][05][1][9322672], for example. These link names show that MCU #02 is connected via the secondary connection type. It should be noted that the MCU ID # and the connection type are pointers to the appropriate location in the MCUs database (250; FIG. 1) in which information on the connection is located. For example, MCU #02 and secondary connection options 2 point to a location in the database in which the IP address/alias of the entry queue of MCU #02 is located. MCU #05 and primary connection options 1 point to a location in the database in which the ISDN number of the entry queue of MCU #05 is located.

Each slave has one cascading connection relevant to the conference link to the master MCU. For MCU #02, for example, the link name can be [02][M][04][2][9322672]. For MCU #05, the link name can be [05][M][04][1][9322672]. When two or more control servers (112; FIG. 1) are used in system (100; FIG. 1), each control server can use similar databases with the same data.

In an alternative embodiment, the central table (242; FIG. 2) is used to handle the information on the cascading links, and the link name is a serial number that points to the relevant entry in the central table. As shown in the searching process 400 of FIG. 4, the central table (242; FIG. 2) is not reset at the beginning of each loop at Block 412 of FIG. 4 in the searching process. At the end of each loop at Block 412 of FIG. 4 of the process, an update of the table is sent to the other control server, if it exists.

After defining the cascading link in Block 534 of FIG. 5, an auto cascading command is prepared for each MCU and sent to the appropriate MCU (Block 536). The auto cascading command is used by the API of the receiving MCU. The cascading command includes layout information (i.e., information governing the mixing of audio and video), relevant link names, dial-in number, conference ID, etc. The dial-in number can be an ISDN number or an IP address/alias depending on the type of the cascading connection. In one embodiment, the dial-in number for cascading is different from the dial-in number used by real participants to eliminate the IVR session during setting the cascading link. In another embodiment, an MCU has a tag to indicate that the caller is an MCU and not a participant, at which point receiving MCU is informed to skip the IVR session. In such an embodiment, the MCUs can use the same dial-in number as real participants. After sending the cascading commends to the relevant MCUs at Block 536, the process 500 is terminated (Block 562).

Returning now to Block 530, if there is a master MCU for the multi-site conference with the appropriate conference ID, then a determination is made whether there is an MCU that has a conference with the same conference ID, that has not been appointed as a slave, and that, therefore, does not have a link to the master MCU assigned for the multi-site conference (Block 540). If such an MCU is found, the process 500 proceeds to Blocks 534 and 536 to define the cascading link and the cascading command for each MCU lacking a link name.

If all the MCUs associated with the relevant conference ID have cascading links at Block 540, then a loop is started on all of the cascading links associated with the relevant conference ID (Block 550). The status of the connection is analyzed and checked (Block 552), and a determination is made whether the connection is disconnected (Block 554). If the connection is still connected, a determination is made whether additional cascading links exist (Block 560). If the connection is disconnected at Block 554, the process 500 returns to Block 550 to check the next cascading link. If there are no additional cascading links at Block 560, then the process 500 terminates (Block 562).

If the connection status indicates that the link has been disconnected at Block 554, then a reconnection command is sent. The reconnection command uses the same connection path as the previous link. Alternatively, the reconnection command uses another cascading link defined at Block 556. The other cascading link uses another type of connection (network) than the one defined in the previous connection. Then, an appropriate link names is set for each side of the connection, the master side as well as for the slave side. A cascading command reflecting the new connection is prepared and sent to the master MCU and the relevant slave (Block 556). The process 500 then proceeds to Block 560.

Different layouts (i.e., the view of the various speakers as sent to the display at the endpoints) can be used in a multi-site conference. In this mode, each slave MCU sends the video and the audio of a participant that was selected as the speaker of the part of the local conference conducted over the slave MCU. The master MCU selects for the multi-site conference the speaker(s) from these local speakers sent by the slave MCUs, and distributes the audio and the video of such speaker(s) to the slave MCUs. (Preferably, similar treatment would be accorded the speaker and participants of the master MCU, which can serve a dual master/slave function). Alternatively, the master MCU can receive all audio and video and pick participants to appear in the layout without assistance from the slave MCUs. Of course, the layout used in the multi-site conference can vary according to user preferences, and can be structured in many different ways, as one skilled in the art will appreciate.

"Cascading" of MCUs as used herein should not be understood as implying a direct connection between multipoint control units so cascaded. It should be understood that cascaded multipoint units can include intervene structures, such as routers, other MCUs, etc.

In the present disclosure, the words "unit," "element," and "module" may be used interchangeably. Anything designated as a unit or module may be a stand-alone unit or a specialized or integrated module. A unit or a module may be modular or have modular aspects allowing it to be easily removed and replaced with another similar unit or module. Each unit or module may be any one of, or any combination of, software, hardware, and/or firmware.

In the description and claims of the present disclosure, "comprise," "include," "have," and conjugates thereof are used to indicate that the object or objects of the verb are not necessarily a complete listing of members, components, elements, or parts of the subject or subjects of the verb. Those skilled in the art will appreciate that the subject matter of the present disclosure can be implemented in the form of software for an MCU, additional hardware added to an MCU, or additional software/hardware distributed among MCUs.

It will be appreciated that the above described systems and methods may be varied in many ways, including, changing the order of steps, and the exact implementation used. The described embodiments include different features, not all of which are required in all embodiments of the present disclosure. Moreover, some embodiments of the present disclosure use only some of the features or possible combinations of the features. Different combinations of features noted in the described embodiments will occur to a person skilled in the art. The scope of the invention is limited only by the following claims.

What is claimed is:

1. In a system having a plurality of different sites, each site having a local multipoint control unit associated with one or more endpoints, a multi-site conferencing method comprising:
    defining an identifier for a multi-site conference;
    establishing at least two local conferences associated with the identifier for the multi-site conference and associated with local multipoint control units at different sites;
    polling the multipoint control units for the at least two local conferences; and
    establishing the multi-site conference by cascading the local multipoint control units of the at least two polled local conferences.

2. The method of claim 1, wherein establishing the at least two local conferences further comprises receiving the identifier as input from an endpoint connected to a local multipoint control unit at a site.

3. The method of claim 1, wherein establishing the at least two local conferences further comprises storing information for each of the local conferences, the information indicating the identifier and the local multipoint control unit associated with the local conference.

4. The method of claim 3, wherein storing information for each of the local conferences comprises storing the information in at least one database table associated with the local multipoint control units.

5. The method of claim 3, wherein polling the multipoint control units comprises periodically searching the stored information.

6. The method of claim 3, wherein polling the multipoint control units comprises searching the stored information in response to a trigger from one of the local multipoint control units.

7. The method of claim 1, wherein cascading the local multipoint control units of the at least two polled local conferences comprises:
    defining one of the local multipoint control units as a master for the multi-site conference;
    defining the other one or more local multipoint control units as slaves; and
    establishing a cascading connection for the multi-site conference between the master and each one of the one or more slaves.

8. The method of claim 7, further comprising monitoring a status of each one of the cascading connection.

9. The method of claim 8, further comprising re-establishing a disconnected cascading connection.

10. The method of claim 9, wherein re-establishing the disconnected cascading connection is done over a path other than the disconnected cascading connection path.

11. The method of claim 7, wherein after establishing the cascading connection for the multi-site conference between the master and each one of the one or more slaves, the method further comprising:
    searching for one or more additional local multipoint control units having a local conference associated with the same identifier of the multi-site conference and lacking a cascading connection for the multi-site conference with the master multipoint control unit;
    defining each of the additional local multipoint control units as an additional slave; and
    establishing a cascading connection for the multi-site conference between the master and each of the additional slaves.

12. In a system having a plurality of different sites, each site having a local multipoint control unit, each local multipoint control unit associated with one or more endpoints and having a connection parameter, a multi-site conferencing method comprising:
    defining an identifier for a multi-site conference;
    establishing at least two local conferences associated with the identifier for the multi-site conference and associated with local multipoint control units at different sites;
    storing information on the at least two local conferences, the information indicating the local multipoint control unit and the identifier associated with the local conference;
    polling the stored information for the at least two local conferences; and
    establishing the multi-site conference by cascading the local multipoint control units of the at least two polled local conferences.

13. The method of claim 12, wherein establishing the at least two local conferences comprises receiving the identifier as an input from an endpoint connected to a local multipoint control unit at a site.

14. The method of claim 12, wherein storing information on the at least two local conferences comprises storing the information in at least one database table associated with the local multipoint control units.

15. The method of claim 12, wherein polling the stored information comprises periodically searching the stored information of the local conferences.

16. The method of claim 12, wherein polling the stored information comprises searching the stored information of the local conferences in response to a trigger from one of the local multipoint control units.

17. The method of claim 12, wherein cascading the local multipoint control units of the at least two polled local conferences comprises:
    defining one of the local multipoint control units as a master for the multi-site conference;
    defining the other one or more local multipoint control units as slaves; and
    establishing a plurality of cascading connections between the master and the one or more slaves using the connection parameters of the local multipoint control units.

18. The method of claim 17, wherein after establishing the cascading connections for the multi-site conference between the master and each one of the one or more slaves, the method further comprises:
    searching for one or more additional local multipoint control units having a local conference associated with the same identifier of the multi-site conference and lacking a cascading connection for the multi-site conference with the master multipoint control unit;
    defining each of the additional local multipoint control units as an additional slave; and
    establishing a cascading connection for the multi-site conference between the master and each of the additional slaves.

19. The method of claim 17, further comprising monitoring a status of each one of the cascading connections.

20. The method of claim 19, further comprising re-establishing a disconnected cascading connection.

21. The method of claim 20, wherein re-establishing the disconnected cascading connection is done over a path other than the disconnected cascading connection path.

22. A system for establishing a multi-site conference between local multimedia conferences, the multi-site conference having an identifier, the system for communicating with a plurality of local multipoint control units at different sites, the system comprising:

one or more databases for storing information on the local multimedia conferences, the information indicating the local multipoint control unit associated with the local multimedia conference and indicating the identifier if associated with the local multimedia conference; and a server configured to:

poll the stored information for at least two local multimedia conferences associated with the identifier and associated with local multipoint control units at different sites, and cascade the local multipoint control units of the at least two polled local multimedia conferences to establish the multi-site conference.

23. The system of claim 22, wherein the server is further configured to store the identifier when input from an endpoint connected to a local multipoint control unit.

24. The system of claim 22, wherein to poll the stored information, the server is further configured to periodically search the stored information of the local multimedia conferences in the one or more databases.

25. The system of claim 22, wherein to poll the stored information, the server is further configured to search the stored information of the local multimedia conferences in response to a trigger from one of the local multipoint control units.

26. The system of claim 22, wherein to cascade the local multipoint control units, the server is further configured to:

define one of the local multipoint control units as a master for the multi-site conference;

define the other one or more local multipoint control units as slaves; and transfer connection parameters to the master and the one or more slaves, the connection parameters instructing the master and the one or more slaves to establish cascading connections between the master multipoint control unit and each one of the slave multipoint control units.

* * * * *